No. 832,381. PATENTED OCT. 2, 1906.
J. HARTNESS.
POWER TRANSMITTING MECHANISM FOR METAL WORKING MACHINES.
APPLICATION FILED SEPT. 17, 1904.

9 SHEETS—SHEET 1.

No. 832,381. PATENTED OCT. 2, 1906.
J. HARTNESS.
POWER TRANSMITTING MECHANISM FOR METAL WORKING MACHINES
APPLICATION FILED SEPT. 17, 1904.

9 SHEETS—SHEET

Witnesses:
Walter P. Abell.
C. C. Stecher

Inventor:
James Hartness
by Wright Brown Dunphy
his attys

No. 832,381. PATENTED OCT. 2, 1906.
J. HARTNESS.
POWER TRANSMITTING MECHANISM FOR METAL WORKING MACHINES.
APPLICATION FILED SEPT. 17, 1904.

9 SHEETS—SHEET 7.

No. 832,381. PATENTED OCT. 2, 1906.
J. HARTNESS.
POWER TRANSMITTING MECHANISM FOR METAL WORKING MACHINES.
APPLICATION FILED SEPT. 17, 1904.
9 SHEETS—SHEET 8.
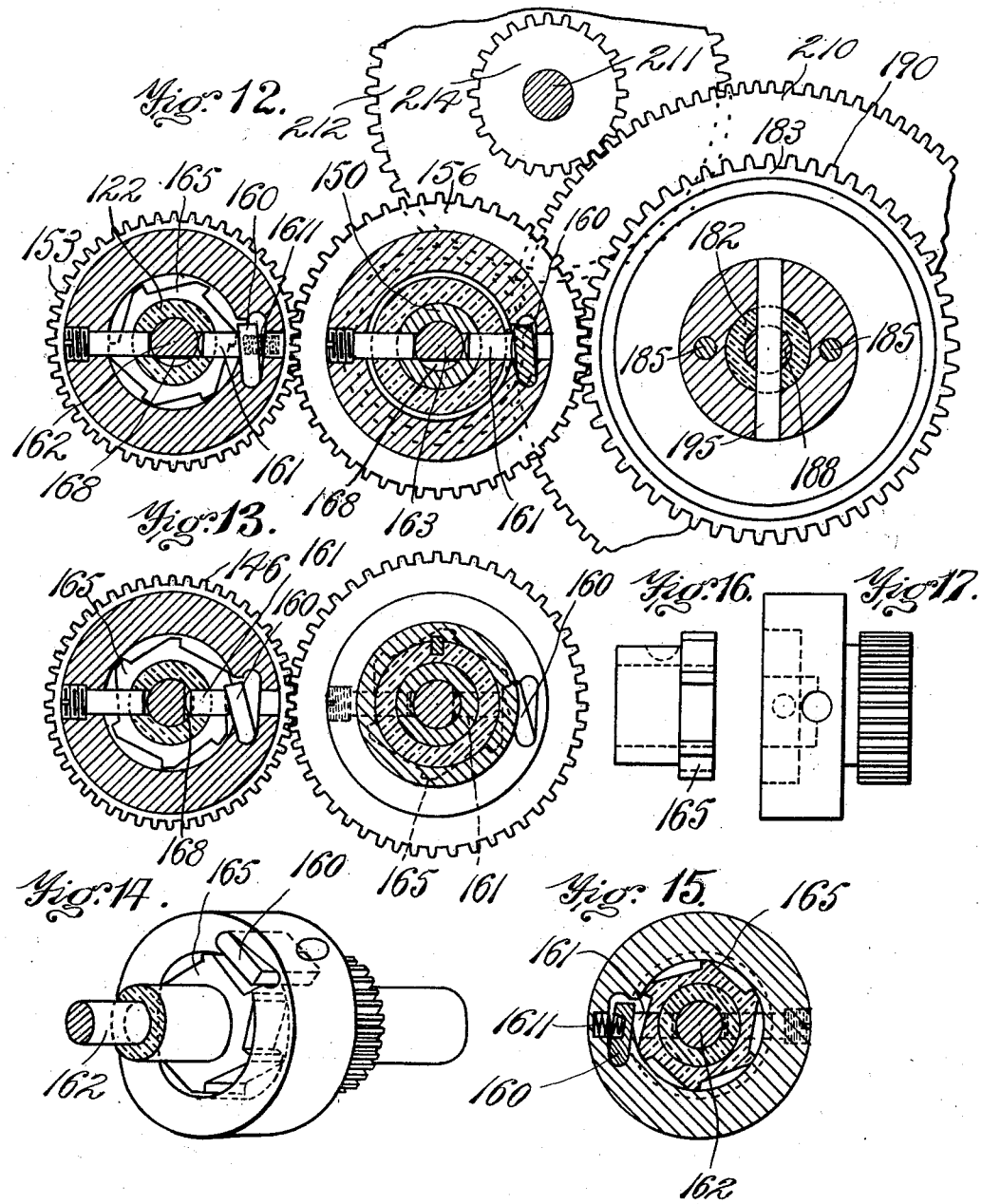

No. 832,381.  
PATENTED OCT. 2, 1906.  
J. HARTNESS.  
POWER TRANSMITTING MECHANISM FOR METAL WORKING MACHINES.  
APPLICATION FILED SEPT. 17, 1904.  
9 SHEETS—SHEET 9.
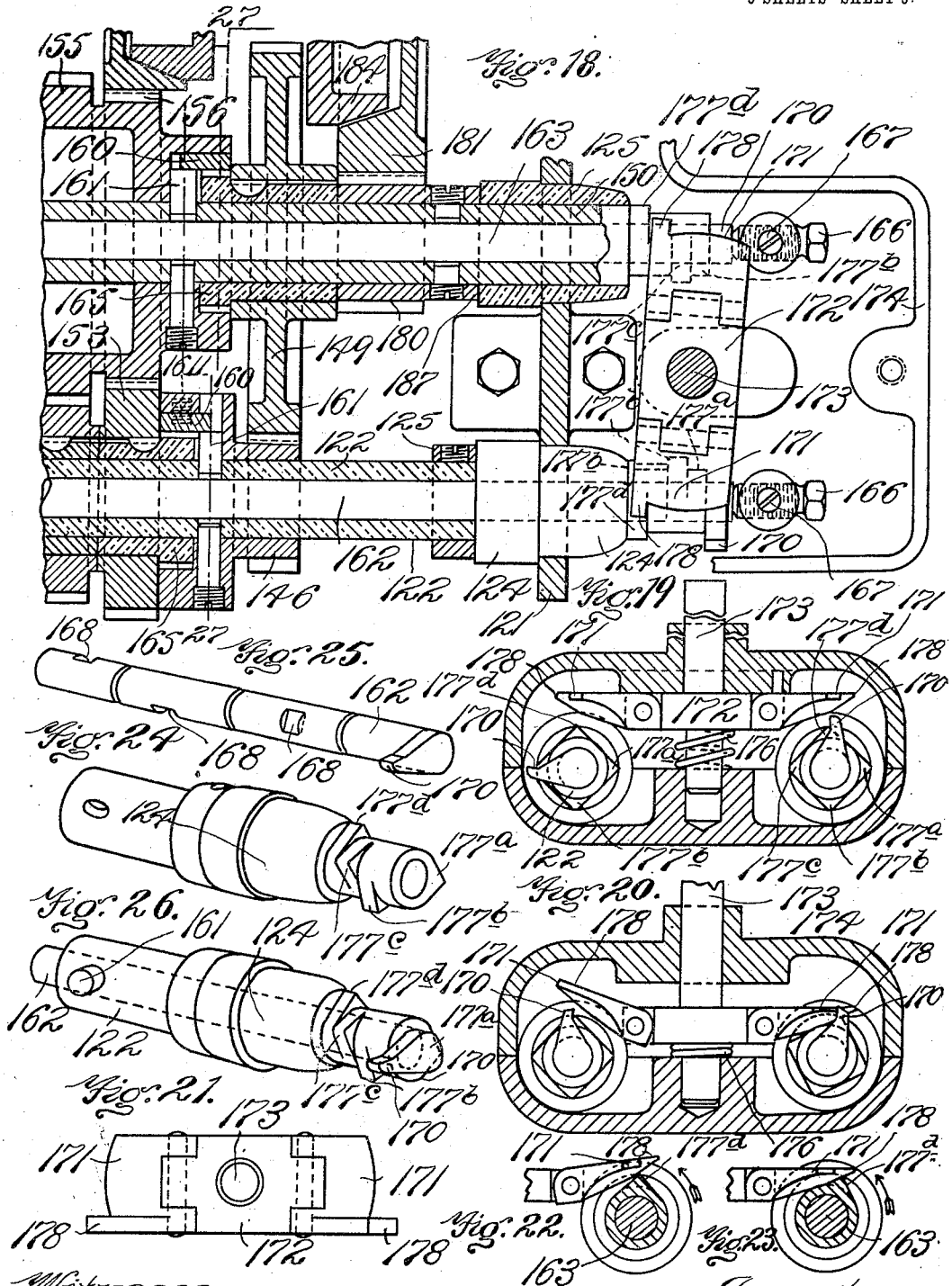

UNITED STATES PATENT OFFICE.

JAMES HARTNESS, OF SPRINGFIELD, VERMONT.

POWER-TRANSMITTING MECHANISM FOR METAL-WORKING MACHINES.

No. 832,381.  Specification of Letters Patent.  Patented Oct. 2, 1906.

Application filed September 17, 1904. Serial No. 224,865.

*To all whom it may concern:*

Be it known that I, JAMES HARTNESS, of Springfield, in the county of Windsor and State of Vermont, have invented certain new and useful Improvements in Power-Transmitting Mechanism for Metal-Working Machines, of which the following is a specification.

This invention has relation to power-transmitting mechanism of the character of that employed in metal-working machinery in which a rotated spindle is employed.

The object of the invention is to provide power-transmitting mechanism interposed between the main power-shaft and the spindle for effecting a variable speed rotation of the spindle, with controlling means whereby the speed of rotation of the spindle may be graded from a relatively low speed to a relatively high speed, and vice versa.

Figure 1:
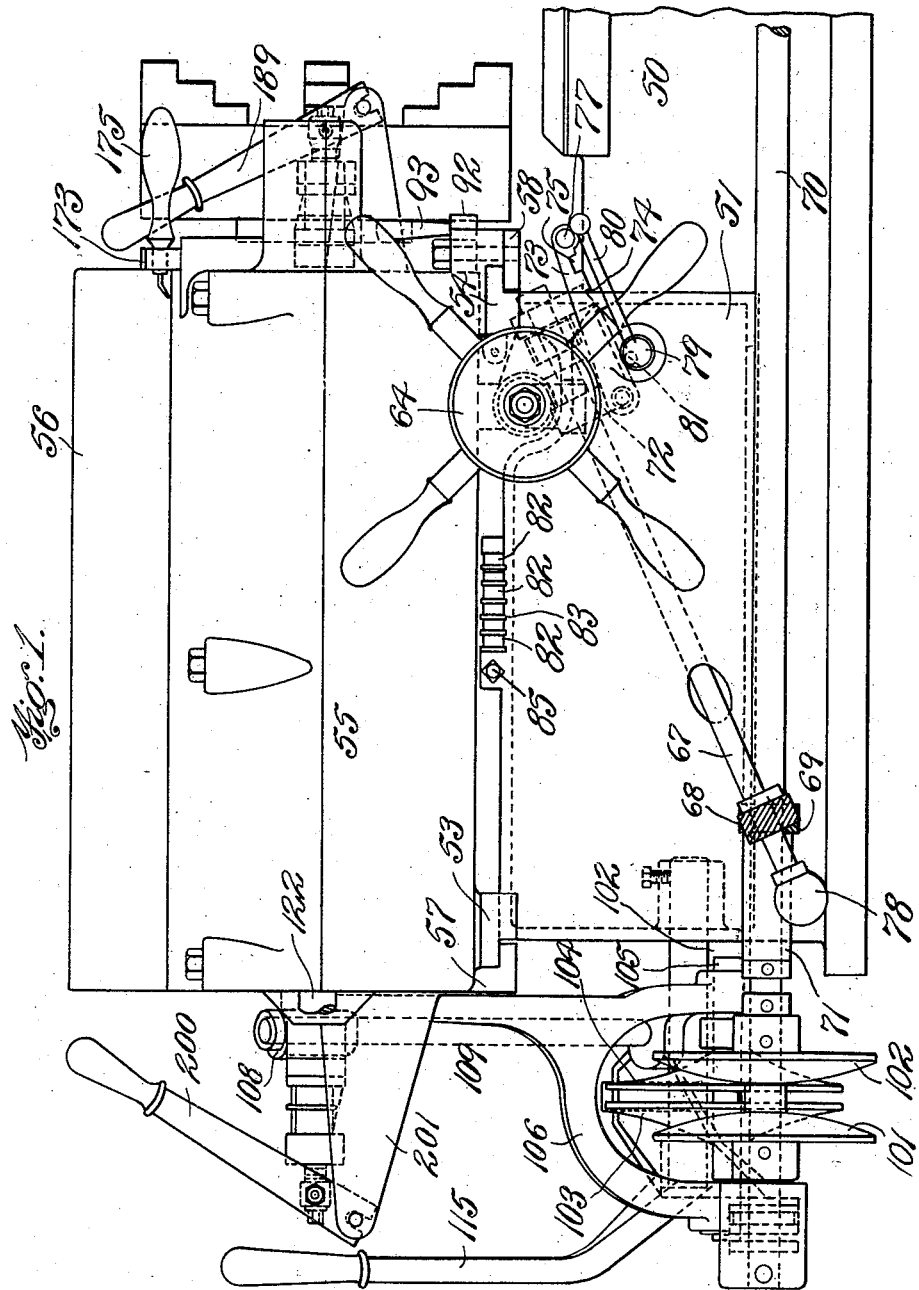
Figure 2:
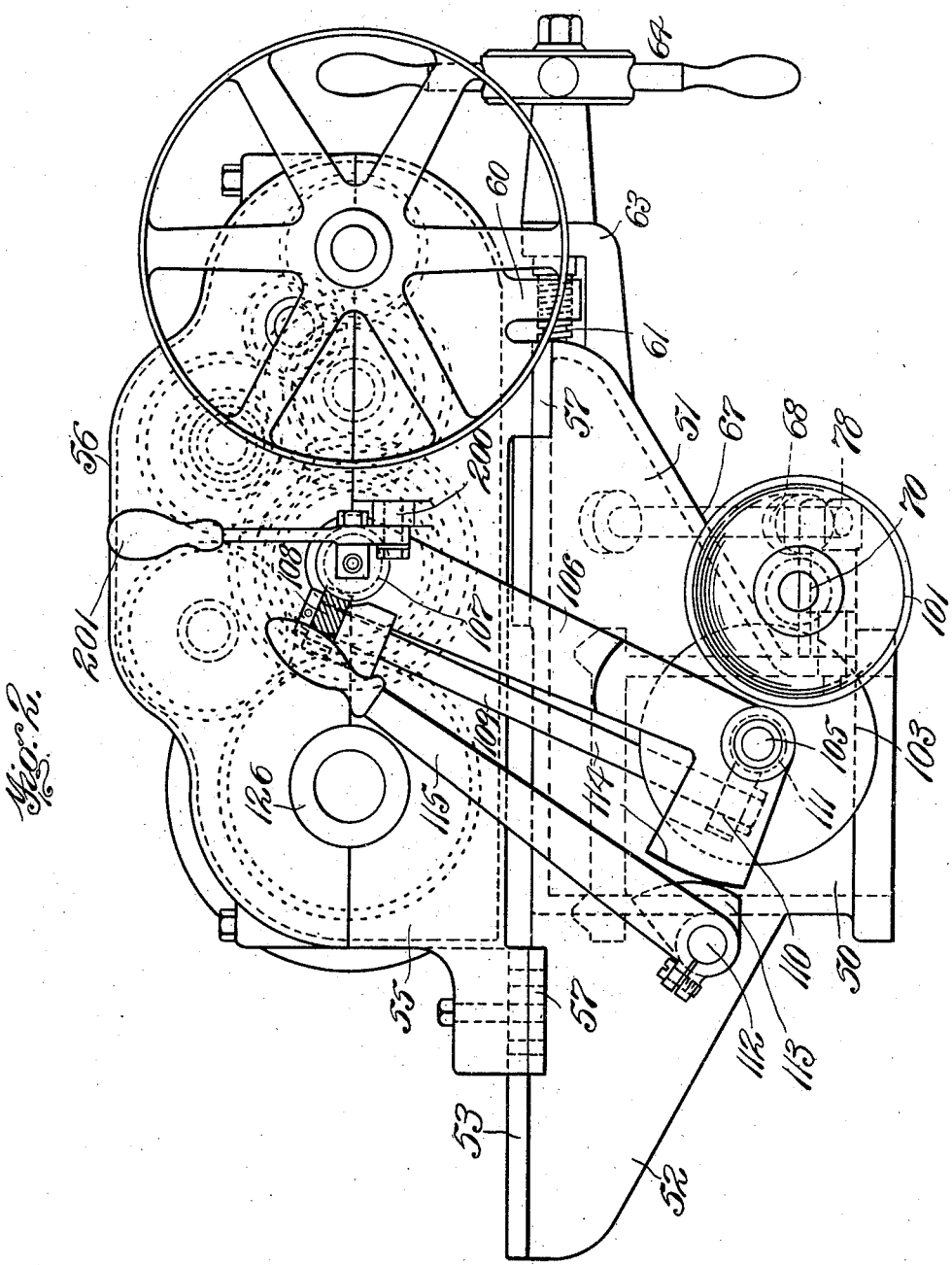
Figure 3:
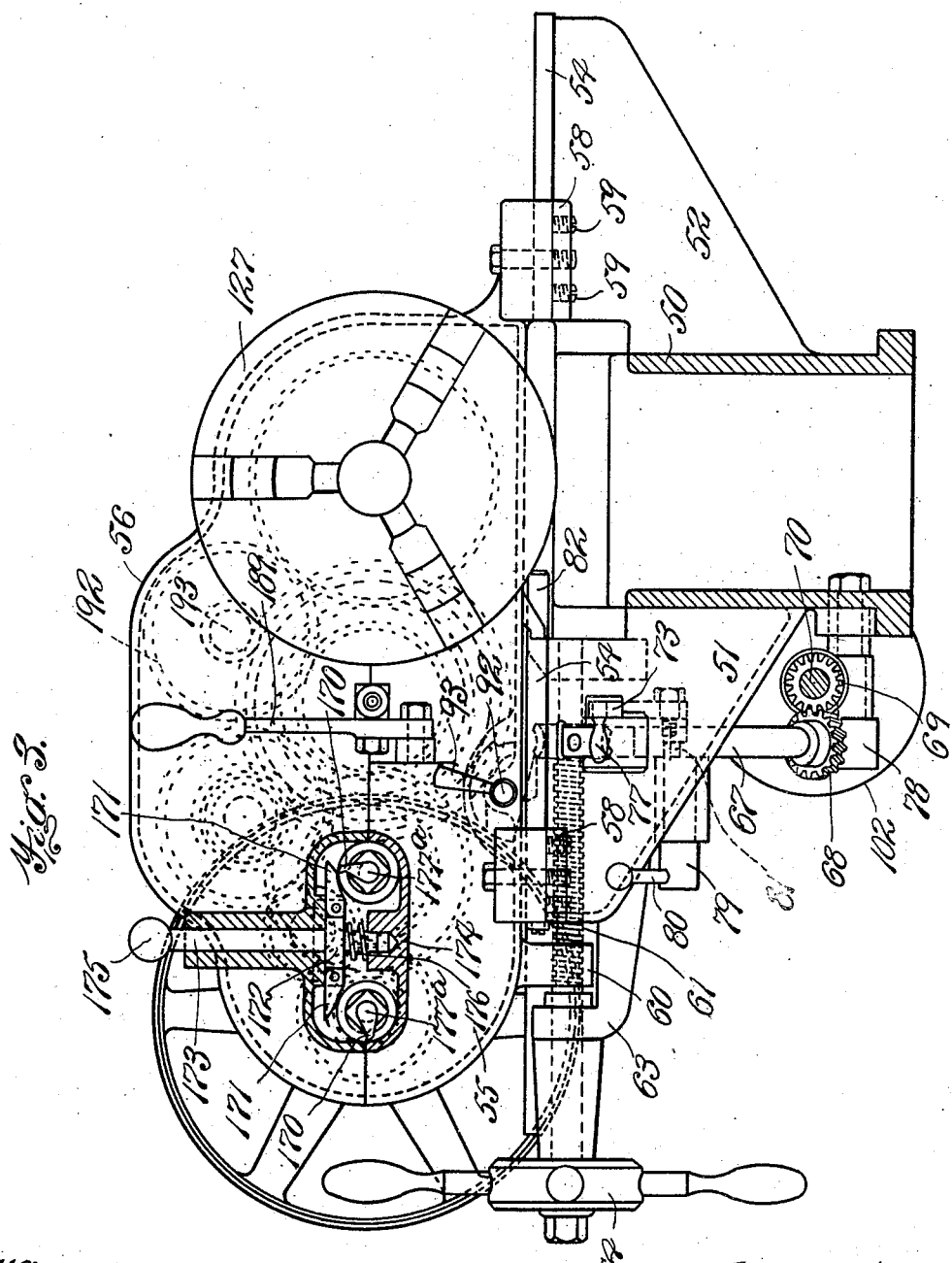
Figure 4:
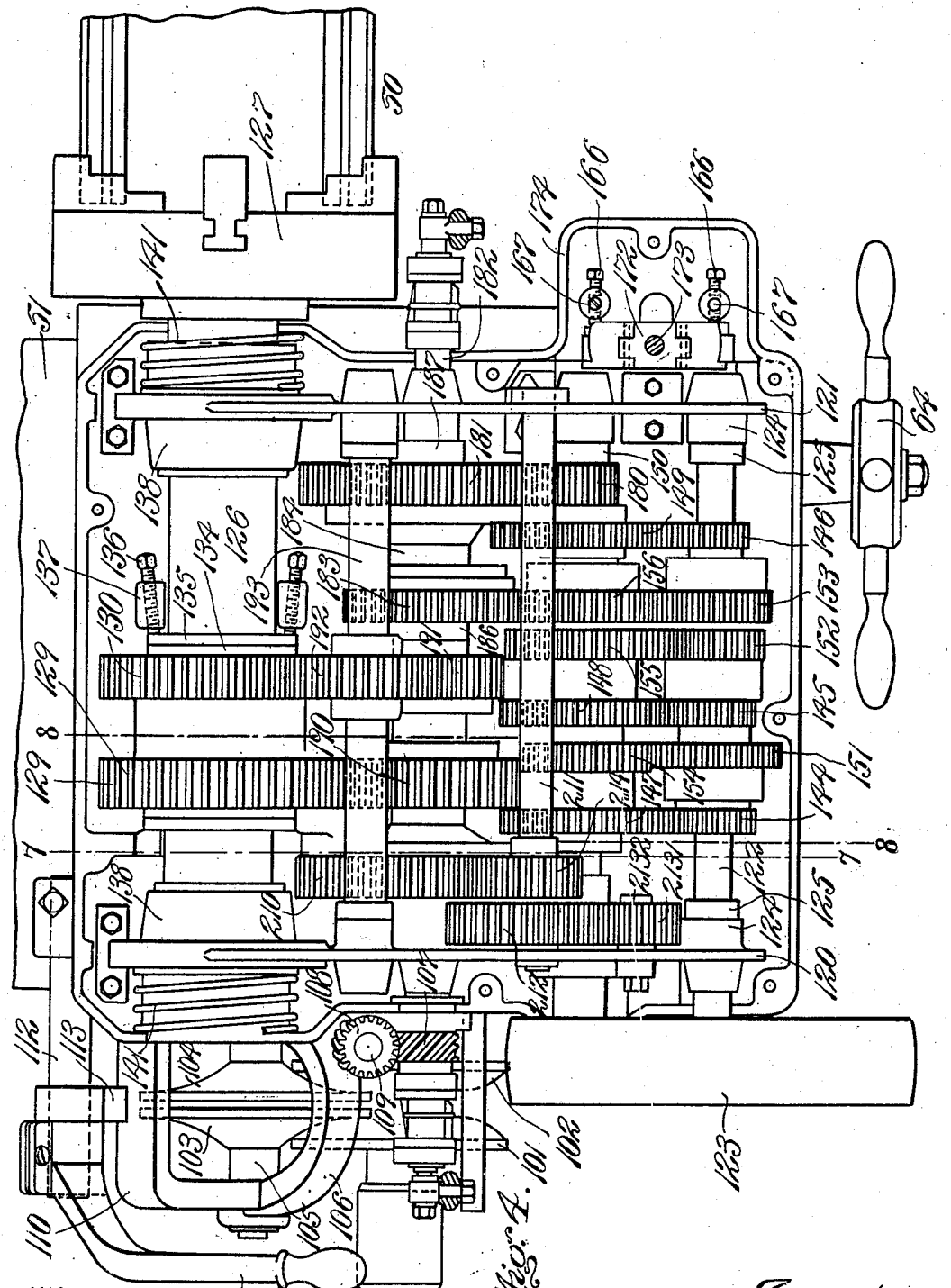
Figure 5:
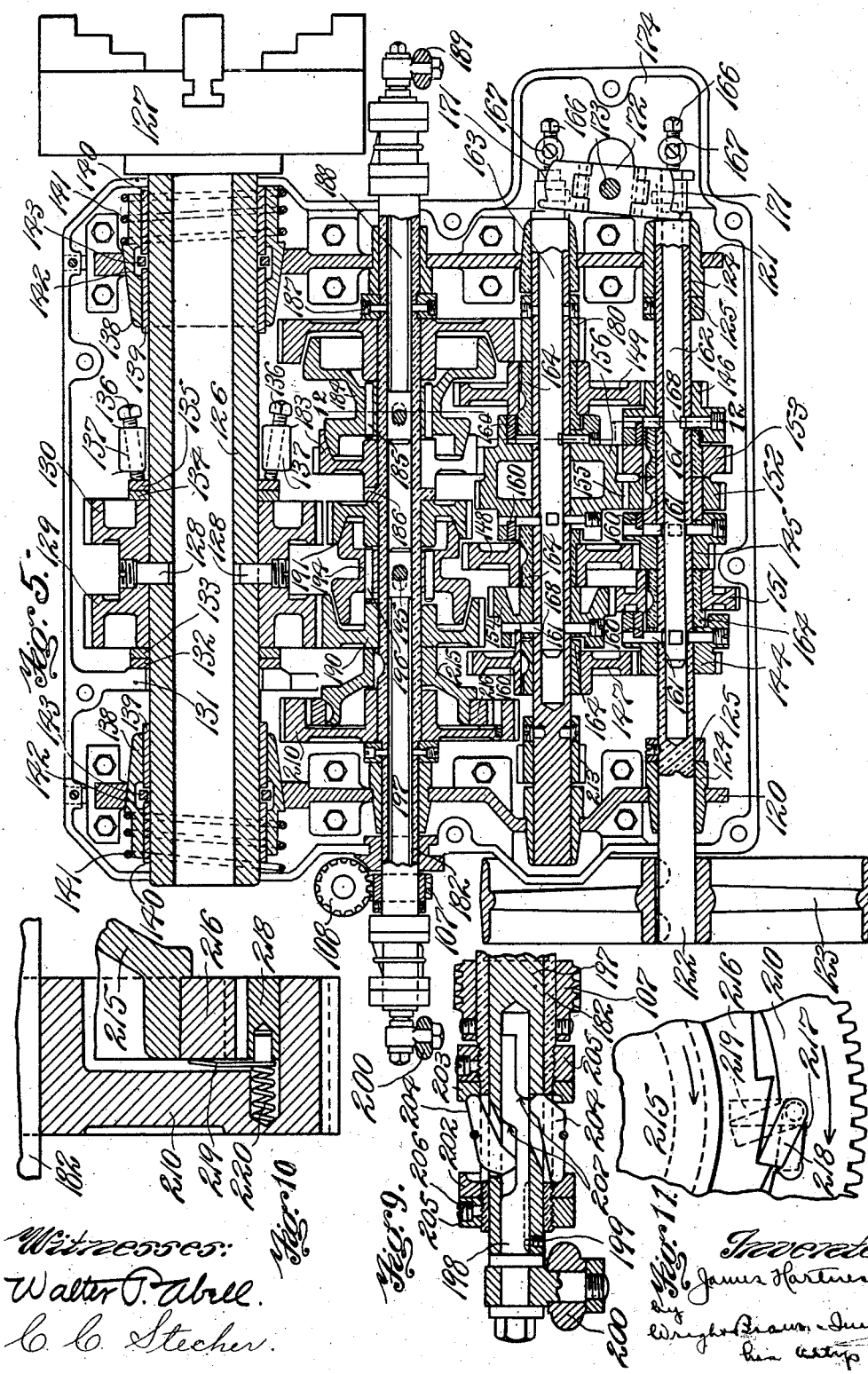
Figure 6:
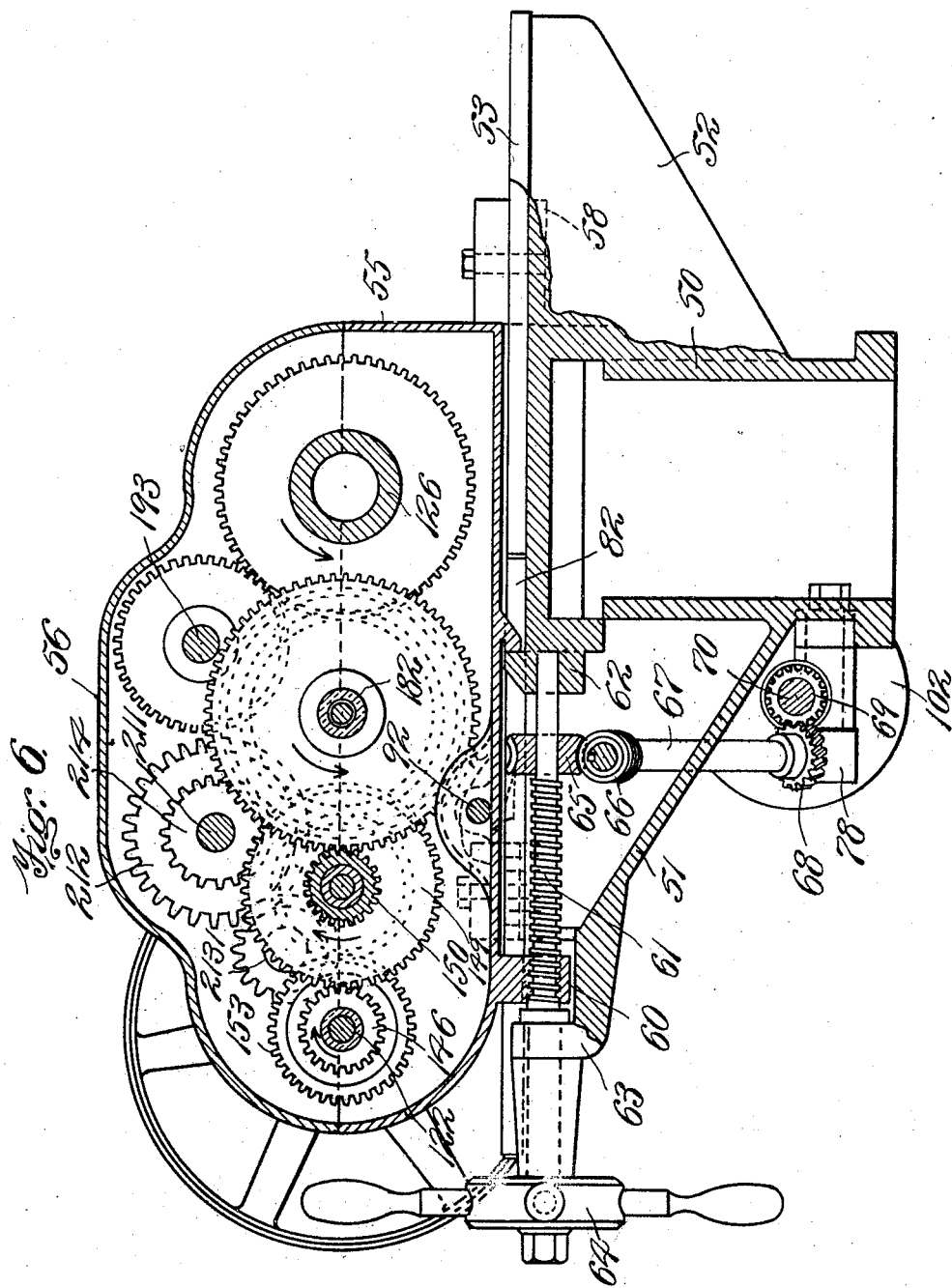
Figure 7:
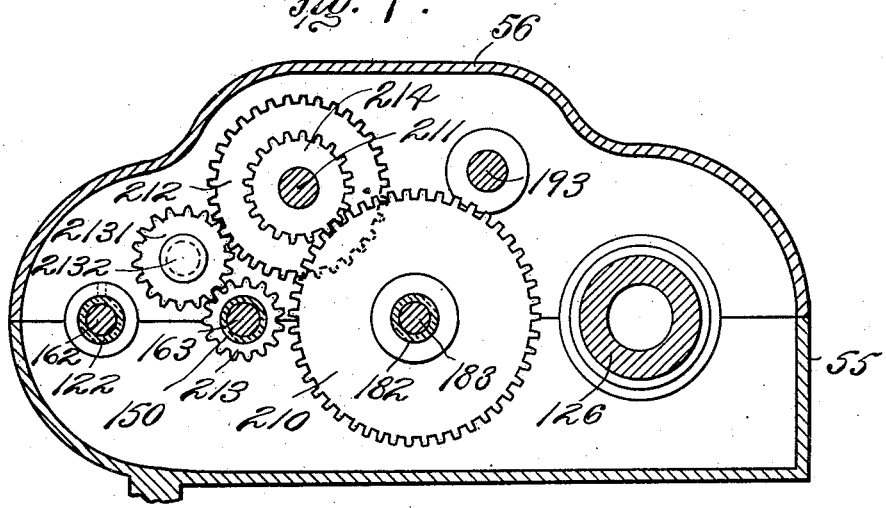
Figure 8:
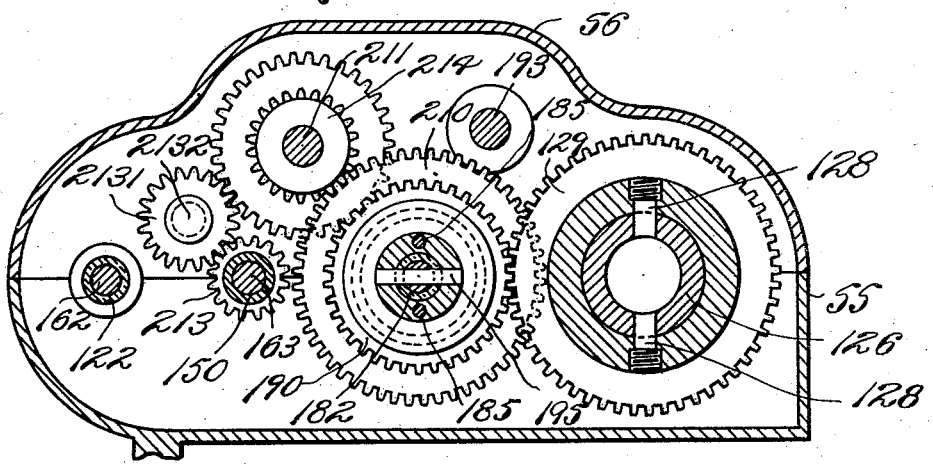

Referring to the accompanying drawings, which illustrate one embodiment of the invention, Figure 1 represents in side elevation the head end of a metal-working lathe. Fig. 2 represents an end elevation thereof. In this figure are illustrated the main power-shaft and the pulley which are not shown in Fig. 1, since said shaft is therein shown as broken off. Fig. 3 represents a partial section transversely through the bed from front to rear and looking toward the head end of the machine. Fig. 4 represents in plan view the head end of the machine with the top or cover of the head removed to show the power-transmitting mechanism therein contained. Fig. 5 represents a horizontal section through the head in a plane coincident with the axis of the spindle. Fig. 6 represents a section through the head of the machine in a plane coincident with the screw-shaft by means of which the head is moved upon the bed of the machine. Figs. 7 and 8 represent transverse sections on the lines 7 7 and 8 8, Fig. 4. Fig. 9, Sheet 5, represents an enlarged longitudinal section of the controller for one of the friction-clutches for throwing in and out the reversing-gears. Figs. 10 and 11 represent the ratchet-clutch on the back gear. Fig. 12, Sheet 8, represents a section on the line 12 12 of Fig. 5. Fig. 13 represents a similar section through two of the gears or ratchet-clutches. Fig. 14 represents one of the ratchet-clutches in perspective view. Fig. 15 represents a section through one of the said clutches. Figs. 16 and 17 represent the two members of one of the ratchet-clutches. Fig. 18 represents an enlarged section on the same plane as Fig. 5 and illustrates the single controller for the differential ratchet mechanism. Figs. 19 and 20 represent the controller in different positions. Fig. 21 represents a view of the controller detached looking at its under side or face. Figs. 22 and 23 illustrate the operation of the controller. Fig. 24 represents a perspective view of the end of the power-shaft. Fig. 25 represents the member in said shaft which controls the clutch-pin. Fig. 26 represents the end of the shaft and the rod or member in their operative relation.

It will be understood that the present invention may be embodied in a turret-lathe such as set forth in Letters Patent No. 457,967, granted to me August 18, 1891, in which there is a carriage movable longitudinally on the bed, a feed-rod for effecting the movement of the carriage, a turret on the carriage, automatic stops on the carriage, and other features forming a part of the lathe.

Referring to the drawings, the lathe-bed is indicated at 50 and has the usual ways or shears for the turret-carriage. At the head end it is provided with forwardly and rearwardly extending portions 51 52, which are provided with parallel ways, guides, or shears 53 54 at a right angle to the ways for the turret-carriage. These guides or shears extend from front to rear transversely of the bed to receive a movable head which contains the spindle and the power-transmitting mechanism therefor. Said head comprises a pan-shaped casing 55 and a top or cover 56. This pan-shaped head is relatively shallow and is adapted for the reception of a quantity of lubricant in which the lower portions of the inclosed bearings and trains of gearing may be immersed to insure a thorough lubrication thereof when in operation. The top or cover prevents the escape of the lubricant and is readily removed to admit of a convenient inspection of the gearing while running and the adjustment and repair of the parts when at rest. The casing 55 is provided at its bottom with gibs 57 58 for taking under the ways or shears 53 54, some of the gibs being provided with adjusting-screws 59.

The head is moved upon the bed by a feed-screw 61 engaging a nut 60 on the head. The feed-screw is suitably journaled in brackets 62 63 on the bed and is equipped with a handwheel 64. Power appliances are employed for effecting the rotation of the feed-screw from a shaft 70. These power appliances comprise an inclined shaft 67, driven by gears 68 69 and suitably geared to the screw-shaft by gears 65 66. (See Fig. 6.)

The feed-shaft 70 is driven frictionally by friction-disks 101 102, engaged with complemental driving-disks 103 104 on the shaft 105, journaled in the yoke 106 on a shaft 182, projecting from the head. The last-mentioned shaft 182 has upon it a spiral gear 107, driving a complemental gear 108 on a shaft 109, journaled in bearings on the yoke, as illustrated in Fig. 2. The said shaft 109 carries at its lower end a spiral gear 110, intermeshing with and driving a complemental gear 111 on the shaft 105. A lever 115 is secured to the shaft 112, arranged in the rear of the yoke to cause a cam 113 on said stud-shaft to engage a complemental cam 114 on the lower end of the yoke for the purpose of rocking the yoke and varying the interposition of the cam-disks.

Referring now to Fig. 5, the spindle and the journal-bearings therefor will be described. Within the casing of the head are secured uprights or supports 120 121, which serve to support the journal-boxes for the various shafts and for the spindle, which are arranged in the head. The main driving-shaft is indicated at 122, and it projects at its end beyond the head for the reception of a belt-wheel 123, by which it may be rotated in one direction and at a constant speed. This shaft is journaled in boxes 124 124, which are driven into the supports 120 121, and it is held against longitudinal movement by collars 125, rigidly secured thereto and bearing against said boxes. Each box tapers outwardly and is formed with a shoulder to bear against the inner face of the web or support 120 121, as the case may be. As the boxes for all of the various shafts are similar to the one described, a detailed description will not be given of any of the others. The spindle is indicated at 126. It consists of a hollow shaft having a smooth unshouldered periphery or exterior surface. In this respect it is essentially different from any of the spindles which have been heretofore used in metal-working machines. On its inner end it is equipped with a chuck 127. The spindle is held against movement by the following devices: Secured to the spindle by two screw-pins 128 128 is the common hub of two gears 129 and 130. On one side of the gear 129 is a flange or web 131, which is cast with the casing or head, and between the said flange and the end of the hub of the wheel are two loose washers 132 133. On the opposite side of the gear 130 are two similar loose washers 134 135, and bearing upon the washer 135 are two set-screws 136 136, passed through ears or lugs 137, cast integral with the head. By adjusting these screws 136 136 the gears 129 130 may be clamped against axial movement and by reason of their pinned connection with the spindle hold said spindle against movement longitudinally of its axis. By the simple expedient of withdrawing the screw-pins 128 128 the spindle may be removed as an entirety from the head by drawing upon the chuck end of it. At each end the spindle is mounted in boxes 138 138, which are exteriorly tapered and are set in the supports 120 121 in tapering apertures provided for their reception. Between the boxes and the shaft are placed bushings 139 140. To hold the boxes in place, strong helical springs 141 encircle the exterior cylindrical ends thereof and bear against shoulders on the bushings and also against the inner wall of the head. Each box or bearing is formed with a cavity 142 for the reception of lubricant and also for the reception of a loose ring 143, which assists in carrying the lubricant to the various parts of the bearing.

Referring to Figs. 5, et seq., inclusive, the mechanism for effecting a variable speed rotation of the spindle from the driving-shaft will now be explained. It may be here stated that the object of this gearing is to provide for rotating the spindle at any one of a large number of speeds and for reversing it without varying the speed or direction of rotation of the driving-shaft. This gearing is so constructed that the spindle may be driven from the lowest speed to the highest speed by a series of steps, as it were, each increase in speed being twenty-five per cent. over the previous speed or in geometric ratio. The speed variations is effected by clutch mechanisms, the finer gradations of speed being secured by positive ratchet-clutches with devices which insure their operation in proper sequence and the greater or coarser gradations being secured by main clutches. The entire range of the finer gradations in speed or the difference between the lowest speed and the highest speed secured by the ratchet-clutches is about equal to the range or difference in speed secured by the main clutches. In this way the low-speed main clutch may be operated, while the ratchet-clutches are operated from relatively low speed to relatively high speed, and then by throwing in the high-speed main clutch the ratchet-clutches may be again operated in sequence from relatively low to relatively high, with the result that the number of fine gradations in speed are equal to the number of ratchet-clutches multiplied by the number of main clutches. In addition to this mechanism there is back gearing including a back-gear clutch which can be operated coincidently with the ratchet-clutches for securing gradations of speed still lower than those secured by the use of the main clutches. There is likewise employed a reversing-gearing with a reversing-clutch, so that without changing the direction of rotation of the prime power-shaft the spindle may be driven in a reverse direction. This reverse-clutch may be operated in conjunction with the ratchet-clutches for effecting a differential speed. The spindle is provided with gears 129 130, as previously described, to which power is imparted by trains of gearing, as will be explained, for the purpose of driving the spindle in one direction or the other, these trains of gearing being interposed between the power-shaft 122 and the spindle. There are interposed between these two elements—to wit, the power-shaft and the spindle—four shafts, which may be termed the "secondary power-shaft," the "back-gear shaft," an "intermediate shaft," and a "reverse-shaft." The power-shaft, the secondary power-shaft, and the intermediate shaft all have their axes located in the same horizontal plane as the spindle, this plane being coincident with the plane of division between the bottom portion of the casing or head and the cover thereof, as shown in Figs. 5 and 6.

The prime power-shaft 122 has pinned to it three gears 144 145 146, which intermesh, respectively, with gears 147 148 149, all loosely mounted upon the secondary power-shaft 150. There are likewise loose upon the power-shaft 122 the following gears: 151, 152, and 153, respectively intermeshing with the gears 154 155 156, all of which are pinned to the shaft 150. The pairs of intermeshing gears 146 and 149, 145 and 148, 144 and 147 are in increasing ratios, as are the pairs of intermeshing gears 151 and 154, 153 and 156, and 152 and 155. Consequently, as will be explained, the shaft 150 may be driven at any one of six speeds relatively to the shaft 122, the ratios of the pairs of coacting gears being such that each increase in speed of the shaft 150 is twenty-five per cent. over the preceding speed. The gears 144, 145, and 146 all rotate in unison with the shaft 122, and therefore the gears 147, 148, and 149 are constantly in rotation loosely upon the shaft 150. Additional clutches are interposed between the last-mentioned three gears and the shaft 150, and similar clutches are interposed between the loose gears 151 152 153 and the shaft 122, these clutches providing for the finer gradations of speed of the spindle.

Each of the fast gears on each of the two shafts 122 150 carries a loose pawl 160, which is adapted to be thrust inward by a spring 161', as shown in Fig. 15. This pawl is placed in a socket formed in a disk-like member carried by the gear and rests loosely upon a pin 161, arranged radially of the gear and passing through an aperture in the shaft. The two shafts are hollow for the reception of rotatable members or rods 162 163, against which the ends of the pins 161 bear.

Each of the loose gears 151, 152, and 153 on the shaft 122 and the gears 147, 148, and 149 on the shaft 50 is keyed to a sleeve or bushing 164, loose upon its respective shaft. This sleeve or bushing in each case is formed on its end with ratchet-teeth 165 and fits into a socket within the disk-like hub of the next adjacent gear, so that the ratchet-teeth are in a potential relation to the pawl 160, carried by said gear.

On the two shafts the fast and loose gears are mounted in pairs, the fast gear 144, for instance, carrying a pawl adapted to engage the ratchet of the gear 151, the gear 145 carrying a pawl for the ratchet-gear 152, and the gear 146 carrying a pawl for the ratchet of gear 153. The arrangement of the gears on the shaft 150 is similar to that just described, there being upon each shaft three pairs of gears having pawls and ratchets arranged in potential relation. This pawl-and-ratchet mechanism forms in each case a positive ratchet-clutch by which the loose gear may be positively keyed to the fast gear.

The pins 161 control the operation of the various pawls 160, mechanism being provided by which these pins are moved into and out of active or inactive position, as the case may be, said mechanism being such that only one pin is active at a time, and the pins are actuated in proper sequence.

The rotative members or rods 162 163 are held against longitudinal movement by set-screws 166, formed in an extension on the inner end of the casing or head, said set-screws being locked in place by additional set-screws 167, arranged at right angles thereto. Each rod 162 or 163 is provided with three recesses or sockets 168, into which the pins 161 may drop when permitted. These sockets are out of line with each other and may be formed by simply flattening the rod 162 163 or forming a short groove in the periphery thereof. The rod may be rotated, as in the case of the rod 162, (shown in Fig. 16,) so that all of the pins 161 will bear against the rounded periphery of the rod and be held in an inactive position; but each rod may be rotated so as to bring a socket 168 under one of the pins 161, as shown in the case of the rod 163 at the left end thereof, where the pin 161, carried by the gear 154, is shown as dropped into a socket, so as to permit the pawl 160 to engage the teeth of the ratchet 165 of the gear 147. Consequently the shaft 150 may by properly rotatively adjusting the rods 162 and 163 be driven at any one of six speeds from the shaft 122. A controller is provided for effecting the relative rotation of these rods and is so constructed that the clutch-pins 161 are permitted to drop into active position in a predetermined order, beginning with the coacting gears having the lowest ratio and ending with that pair of gears having the greatest ratio—to wit, those indicated at 153 and 156—whereby the shaft 150 is driven gradually from its lowest to its highest speed, the increment of increase being twenty-five per cent. over the preceding rate of speed. The controller for the rods 162 163 is best shown in Figs. 18 to 26, inclusive. Each of the rods 162 163 is formed with a finger 170, adapted to be engaged by an abutment 171. These two abutments constitute stops hinged to a carrier 172. This carrier is secured to an upright shaft 173, journaled in the extension 174 of the head or casing and is equipped on its end with a handle 175, by which it may be depressed and rotated.

The carrier is held yieldingly upward by a spring 176, as shown in Figs. 3 and 19. The two stops 171 171 may be brought alternately into the path of the fingers 170 170 of the rods 162 163. (See Fig. 18.) The sockets or flattened places 168 of each of the rods 162 163 are quartered with relation to each other, so that in order to render the pins 161 active in succession it is necessary to give each shaft at the proper time a quarter of a rotation. Therefore when the carrier 172 is depressed, so as to bring a stop 171 into the path of a finger 170, the stop holds the finger and the rod against rotation so long as the carrier is depressed. Consequently mechanism must be provided for throwing the stop to an inoperative position as soon as the rotation of the rod has been retarded a predetermined length of time, so as to effect a relative rotation of the rod and its shaft ninety degrees, one hundred and eighty degrees, or two hundred and seventy degrees. It should be remembered that the rods are simply frictionally mounted within the shafts 122 and 150 and normally rotate with them unless retarded to effect their relative rotation. Each shaft is therefore provided with a series of cams $177^a$ $177^b$ $177^c$ $177^d$, arranged at an angle of ninety degrees relatively to each other, as shown in Figs. 19 and 20 and 24 and 26. For coaction with these cams separately each of the stops 171 has a cam 178, and the carrier 172 may be rotated to bring a cam 178 into the vertical plane of any one of the cams $177^a$ $177^b$, &c. It will be observed that the two cams 178 on the stops 171 are in line with each other, so that when the carrier 172 is rotated in one direction one of the cams 178 rides up on the box 124, the cam on the other stop being thereby moved to active position with relation to the cams on the shaft 150, and that when the carrier is rotated in the other direction the other cam 178 rides on the box 125, which thereby serves to lift it to an inactive position with relation to the cams and the finger on the rod 163. It will be further observed that by gradually rotating the carrier 172 with a step-by-step movement, first in a direction opposite the movement of the hands of a watch in Fig. 18 and then in the opposite direction or with the movement of the hands of a watch, the cam 178 on one stop is brought into alinement with the cams $177^a$, $177^b$, $177^c$, and $177^d$ on the rod 162, and then the cam 178 on the other stop is brought successively into alinement with the cams on the rod 163. As each stop when the carrier is depressed and rotated to proper position comes into line with the finger 170 it checks the rotation of the rod 162 or 163, as the case may be, and holds it until one of the cams $177^a$, $177^b$, $177^c$, or $177^d$ engages the cam 178 on the said stop and permits the finger and the rod to again rotate with the shaft. In Fig. 20 at the right-hand side the finger 170 is shown as retarded by the stop 171. Now when the proper cam comes around—as, for instance, cam $177^d$ in Fig. 23—it engages the cam 178 and lifts it and the stop so as to permit the finger to rotate. Therefore by properly depressing and manipulating the controller (comprising the carrier and stops and cams carried thereby, the shaft 173, and the handle 175) the rods 162 163 may be retarded to cause the coaction of the several pairs of gears by their respective clutches in proper order to drive the shaft 150 at six different speeds in succession, and by oppositely manipulating the controller the speed of rotation of the shaft 150 may be decreased step by step until it is driven at its slowest speed or its rotation is stopped, as when all of the clutch-pins are in inactive position. In order to start the gearing, it is necessary that the clutch-pin 161, carried by the gear 156, should be dropped to an inactive position, so as to clutch the gear 149 with the shaft 150.

The shaft 150 carries, in addition to the gears hereinbefore referred to, another gear 180, which is pinned thereto. This gear intermeshes with a large gear 181, which is loose upon the intermediate shaft 182. This last-mentioned shaft 182 is the one which carries the spiral gear 107, intermeshing with and driving the gear 108, hereinbefore referred to. Said shaft carries, in addition to the gear 181, a loose gear 183, intermeshing with and driven by the gear 156. Each of the two gears 181 and 183 is provided with a friction-surface on the interior of its rim, whereby it may be engaged frictionally by a double clutch 184, pinned to the shaft and adapted to slide thereon. The difference in speed of rotation of the spindle effected by clutching the gears 181 183 to the shaft is relatively great or equal to the range or difference in speed of the whole set of ratchet or auxiliary clutches.

Passing through the hub of the clutch 184, so as to lie parallel to the axis thereof, are pins 185, which bear against hubs of the gears 181 183 to hold them against movement relatively to each other, said gears being held against outward movement by a flange 186 on the shaft and by a collar 187 pinned thereto.

The clutch 184 may be moved in one direction or the other to connect the shaft to the two gears alternately by a rod 188, passed into the shaft which is hollow for this purpose.

The mechanism by means of which the rod 188 is moved will be subsequently described, it being sufficient at the present time to state that it is effected by means of a lever 189, as shown in Fig. 3, and devices interposed between said lever and said rod. By moving the lever in one direction the gear 181 is clutched to the shaft and by moving it in the opposite direction the gear 183 is clutched to the shaft. Therefore inasmuch as the gear 156 and the gear 180 are both fast upon the shaft 150 it is apparent that any one of the six speeds at which the shaft 150 is driven may be multiplied by two in transmission to the shaft 182, so that said shaft may be driven at any one of twelve different speeds from the two gears 156 and 180, according to the position of the main double clutch 184.

The shaft 182 has mounted loosely upon it a gear 190, which intermeshes with the gear 129 on the spindle. These two gears are utilized for rotating the spindle in the usual direction; but for the purpose of reversing the rotation of the spindle the following train of gearing is utilized: Loose upon the shaft 182 is a gear 191, which intermeshes with a reversing-gear 192, keyed upon the reverse-shaft 193, mounted in boxes in the guides or uprights 120 121. (See Figs. 3 and 4.) This gear 192 also intermeshes with the gear 130 on the spindle. The two gears 190 191 have friction-surfaces on the interior of their rims adapted to be alternately engaged by complemental friction-surfaces on a double clutch 194, pinned to the shaft 182 by a pin 195 passing through a slot in the said shaft into the hub of the clutch. The gear 191 is held against the shoulder or flange 186 and is spaced from the gear 190 by the pins 196, passed through apertures in the hub of the clutch and arranged in a direction parallel to the axis thereof. Connected to the pin 195, which, as has been stated, is secured to the clutch, there is a rod 197 placed inside of the hollow shaft 182. This rod is similar to that at 188 as previously described, and it is adapted to be moved longitudinally to cause the clutching of the shaft 188 to the gear 190 or the gear 191 to effect the rotation of the spindle either in one direction or the other. As has been stated, the mechanism for moving these rods is similar, so that by describing that utilized for operating the rod 197 it will suffice for the other likewise.

In Fig. 9 the rod 197 is shown as being hollow at its extreme end to receive a longitudinally-slidable pin 198, splined within the rod by a spline 199. This pin is connected to a reversing-controller 200, which consists of a lever fulcrumed on a bracket 201, as shown in Fig. 1. By swinging the lever in one direction or the other the pin 198 is moved longitudinally within the rod 197. Screwed upon the shaft 182 are two abutments 202 203, socketed to receive the ends of two dogs 204, which are oppositely arranged, so that one dog bears against the abutment 202 and the other bears against the abutment 203. These abutments are held securely against longitudinal movement by collars 205 and set-screws 206. The dogs project through slots in the shaft 182 and the rod 197, so that their inner ends bear against the pin 198, which is formed with cam-shoulders 207 207. Each dog 204 bears at one end against the abutment 203 and is cam-shaped at its other end, so as to bear against the end of the slot in the rod 197. Now by moving the pin 198 to the right, as shown in Fig. 9, one dog 204 is thrust outward, and by reason of its location, as described, the rod 197 is thrust to the right by a cam action of the end of the dog thereon. By moving the pin 198 to the left the cam-shoulder 207 will engage the cam end of the other dog and thrust it outward, the first-mentioned dog dropping to an inactive position. This effects a movement of the rod 197 in the opposite direction. Therefore an oscillation of the lever 200 in one direction or the other effects the connection of the shaft 182 to the spindle 126, so as to rotate it either in one direction or the other.

The shaft 182 is provided with a fifth gear, which is indicated at 210 and which is adapted to be driven through the medium of the back-gear shaft 211. (See Figs. 4, 5, 7, and 8.) The back-gear shaft is in substantially the same plane as the reversing-shaft 193, as shown in said figures. It is provided with a pinion 214, which intermeshes with and drives said gear 210, and said shaft is rotated from the shaft 150 by a train of gears comprising a pinion 213, pinned to the shaft 150, an idler-gear 213' loose on a stud-shaft 213², projecting inwardly from one of the supports, and a large gear 212 on the shaft 211. By virtue of this construction the gear 210 is rotated constantly so long as the shaft 150 is actuated.

A ratchet-clutch is utilized for connecting the gear 210 with the shaft 182. This clutch mechanism is automatic, as illustrated in detail in Figs. 10 and 11. It includes a wheel 215, keyed to the shaft, and having on its rim a ratchet 216, which extends under the rim of the wheel 210. The rim of the wheel 210 is socketed at 217 for the reception of a pawl 218, said pawl having a rounding end adapted to fit in the rounded end of the socket 217. To the inner edge of the pawl is secured a friction-plate 219, which extends into the space between the ratchet 216 and the inner face of the gear 210. When the ratchet 216 is rotating more rapidly than the gear 210, this friction-plate by its connection with the pawl throws the pawl into the dotted position in Fig. 11; but when the speed of the ratchet is less than that of the gear 210 the said friction-plate causes the ratchet to be thrown outward to the full-line position in the last-mentioned figure by reason of the frictional engagement of said plate with the inner face of the ratchet 216. A spring 220 insures the frictional engagement of the plate with the inner face of the ratchet. The advantage of this construction over the ordinary lazy-pawl arrangement in which the pawl is adapted to engage the ratchet is that when the ratchet is driven at a higher rate of speed than the speed of rotation of the gear the pawl is automatically moved out of engagement with the teeth, so as to prevent its clattering thereon. In order that the back gear may be effective, the double clutch 184, hereinbefore described, (see Fig. 5,) should be in a neutral position, with the pin 198 (see Fig. 9) halfway between its limits of movement and with both dogs 204 inactive. This neutral position of the clutch 184 would, if the back-gear mechanism were not provided, permit a cessation of rotation of the shaft 182; but inasmuch as the gear 210 is constantly rotated from the shaft 150 the movement of the double clutch 184 to neutral position simply permits the ratchet-wheel 215 to slow down until it is picked up by the pawl and caused to rotate at a slow speed synchronously with the gear 210. Therefore the clutch 184 may be denominated the "back-gear clutch" and the controller-lever 189 may be termed the "back-gear controller." The back gear performs the usual function of effecting the rotation of the spindle at a reduced speed and with correspondingly greater power; but inasmuch as the shaft 150 may be driven at any one of six speeds, as hereinbefore stated, it is evident that by throwing in the back gear the shaft 182 may be driven at six relatively slower speeds, or at any one of eighteen speeds in all. Each pair of intermeshing gears on the two shafts 122 150 may be termed a pair of "power-transmitting" members, and it will be observed that of two adjacent pairs of members the corresponding members of said pairs are respectively fixed to and loose on the shafts, so that one member of each pair is loose on its shaft and the other member is fast on its shaft. In connection with this arrangement it is possible by means of the controlling mechanism to alternately and positively clutch the corresponding members of the pairs, whereby the member which is fast on the driving-shaft actuates the member which is fast on the driven shaft through the medium of either member of the same couple or the corresponding member of the other couple. It may be stated that the members of the pairs are alternately fast and loose on the primary driving-shaft and the secondary driving-shaft.

The advantage of a construction of this character is unquestionably apparent to those skilled in the art to which this invention relates. It is possible for the operator to drive the spindle at practically any speed that may be desired.

The entire speed-varying mechanism is mounted in the head, which is shallow and pan-shaped, so that the gearing is all located in the same horizontal plane and the head is movable on the ways so as to traverse the work-carrying spindle relatively to the tools. The variable-speed gearing is particularly designed for the lathe and is exceedingly compact.

Having thus explained the nature of the invention and described a way of constructing and using the same, although without attempting to set forth all of the forms in which it may be made or all of the modes of its use, I declare that what I claim is—

1. In combination, a driven member, a power-shaft rotated at a constant speed, and variable-speed gearing interposed between the power-shaft and the driven member, said gearing comprising friction-clutches for effecting coarse or great gradations in the speed of the driven member, positive clutches for subdividing the great gradations of speed into a plurality of fine gradations; a single controller and mechanism controlled by said controller for causing the actuation of said positive clutches in a predetermined sequence.

2. A power-transmitting mechanism comprising a driving-shaft, a driven shaft, two pairs of power-transmitting members mounted on said shafts, the corresponding members of said pairs being respectively fixed to and loose on the said shaft, whereby one member of each pair is loose on its shaft and the other member is fast on its shaft, and means for alternately and positively clutching the corresponding members of the pairs, whereby the member which is fast on the driving-shaft actuates the member which is fast on the driven shaft through the medium of either the other member of the same pair or the corresponding member of the other pair.

3. A power-transmitting mechanism comprising a driving-shaft, a driven shaft, two pairs of power-transmitting members mounted on said shafts, and each pair consisting of intermeshing gears, one of the gears on the driving-shaft being fixed thereto with its coacting gear loose on the driven shaft, and the other gear on the driving-shaft being loose thereon with its coacting gear fast on the driven shaft, and means for positively clutching and unclutching the two confronting gears on each of the said shafts.

4. A power-transmitting mechanism comprising a driving-shaft, a driven shaft, two pairs of power-transmitting members mounted on said shafts, with the members of one pair in different ratio from that of the members of the other pair, and each pair consisting of intermeshing gears, one of the gears on the driving-shaft being fixed thereto with its coacting gear loose on the driven shaft, and the other gear on the driving-shaft being loose thereon with its coacting gear fast on the driven shaft, a clutch mechanism being interposed between the confronting gears on each shaft, and means for alternately operating the said clutch mechanisms.

5. A power-transmitting mechanism comprising a driving-shaft, a driven shaft, a plurality of rotary power-transmitting members on said shafts and arranged in pairs for effecting the rotation of the driven shaft at a number of rates of speed, equal to the number of pairs, one-half of the members on one shaft being fixed thereon and the remainder loose thereon and one-half of the members on the other shaft being loose thereon and the remainder fixed thereon, the corresponding members of each pair being provided with pawl-and-ratchet clutch mechanisms and means for operating said clutch mechanisms successively, whereby the speed of the driven member may be changed from the lowest rate to the highest rate or vice versa by successive gradations.

6. A power-transmitting mechanism comprising a hollow driving-shaft, a hollow driven shaft, a plurality of pairs of rotary power-transmitting members on said shafts for effecting the rotation of the driven shaft at a number of rates of speed equal to the number of the said pairs, the members on one shaft being alternately fast and loose thereon and the members on the other shaft being alternately loose and fast thereon, a pawl-and-ratchet clutch mechanism interposed between the corresponding members of each pair, a series of radial pins extending into each shaft for actuating the pawls of the clutch mechanism, and means extending into said shafts for actuating said pins successively.

7. A power-transmitting mechanism comprising a driving-shaft, a driven shaft, an intermediate shaft, a reverse-shaft, gears connecting the reverse-shaft and the driven shaft, gears connecting the reverse-shaft and the intermediate shaft, a pair of gears connecting the driven shaft and the intermediate shaft, friction-clutch mechanism for connecting the gears on the intermediate shaft alternately thereto, a plurality of rotary power-transmitting members arranged in pairs and connecting the driving-shaft and the intermediate shaft, the members of the pairs of members being alternately fast and loose on the respective shafts, whereby one member of each couple is fast upon its supporting-shaft, and the other member is loose, and means for successively clutching the corresponding members of said pairs, substantially as described.

8. A power-transmitting mechanism comprising a hollow driving-shaft, a hollow driven shaft, two pairs of gears of different ratios mounted on said shafts, each pair having one gear fixed to one shaft and the other gear loose on the other shaft, and one gear on each shaft being loose thereon and the other fast thereon, clutches interposed between the gears on each shaft, and a rod or bar extending into each shaft for controlling the operation of said clutches, and a single controller for said rods or bars.

9. The combination of a primary power-shaft, a secondary power-shaft, a series of pairs of gears of different ratios on said shafts, clutches between said gears and said shafts, by which the secondary shaft may be driven from the primary shaft at a number of speeds equal to the number of pairs of gears, a third shaft, a plurality of pairs of gears of different ratios on the secondary shaft and the third shaft, a train of back gears loosely connecting the secondary shaft with the third shaft, clutch mechanism by which the third shaft is driven through any one of the last-mentioned pairs of gears or through the back gears, and controlling means for said clutch mechanism.

10. The combination of a primary shaft, a secondary power-shaft, a series of pairs of gears of different ratios on said shafts, clutches between said gears and said shafts, by which the secondary shaft may be driven from the primary shaft at a number of speeds equal to the number of pairs of gears, a third shaft, a plurality of pairs of gears of different ratios on the secondary shaft and the third shaft, a train of back gears loosely connecting the secondary shaft with the third shaft, clutch mechanism by which the third shaft is driven through any one of the last-mentioned pairs of gears or through the back gears, a spindle, and means for clutching said spindle to said third shaft.

11. The combination of a primary power-shaft having a member by which it is rotated, an intermediate shaft, variable-speed mechanism by which the intermediate shaft may be actuated at different speeds from the primary power-shaft without increasing the speed of said primary power-shaft, a spindle, a reverse-shaft, gearing connecting the intermediate shaft to the spindle, gearing connecting the reverse-shaft to the intermediate shaft and to the spindle, and a clutch on the intermediate shaft for clutching thereto either the spindle-gearing or the reverse-shaft gearing.

12. The combination of a driving-shaft, a spindle, an intermediate shaft, back gearing loosely interposed between the driving-shaft and the intermediate shaft, reverse-gearing loosely interposed between the intermediate shaft and the spindle, direct gearing loosely interposed between the intermediate shaft and the spindle, variable gearing loosely interposed between the intermediate shaft and the driving-shaft, and clutch mechanisms to connect said intermediate shaft to the back gearing, the reverse-gearing, the direct gearing and the variable gearing either singly or in combinations.

13. The combination of a driving-shaft, a spindle, an intermediate shaft, back gearing loosely interposed between the driving-shaft and the intermediate shaft, reverse-gearing interposed between the intermediate shaft and the spindle, direct gearing loosely interposed between the intermediate shaft and the spindle, variable gearing loosely interposed between the intermediate shaft and the driving-shaft, a clutch mechanism by which the intermediate shaft is clutched to either the variable gearing or the back gearing, and a clutch mechanism by which the intermediate shaft is clutched to either the direct gearing or the reverse-gearing 14. The combination of a rotary shaft, a plurality of clutches thereon, a member in said shaft having provisions for operating said clutches in a predetermined order, a movable stop adapted to engage said member and hold it against rotation and having a finger, and a plurality of cams on said shaft adapted to engage said finger and disengage said stop from said member.

15. The combination of a rotary shaft, a plurality of clutches thereon, a member in said shaft having provisions for operating said clutches in a predetermined order, a stop adapted to engage said member and having a finger, and separated cams on said shaft, said stop being oscillatory to bring said finger into line with any one of said cams to effect the disengagement of said stop from said member.

16. The combination of parallel rotary hollow shafts, a series of clutches thereon, a member therein for operating the clutches thereon in predetermined order, and a series of cams thereon, a controller having stops thereon for separately engaging said members, and holding them against rotation, and fingers adapted to be engaged by said cams to release said members from said stops.

In testimony whereof I have affixed my signature in presence of two witnesses.

JAMES HARTNESS.

Witnesses:
D. S. BROWNELL,
F. B. GILL.